United States Patent
Hagiwara (12)

(10) Patent No.: US 7,214,378 B2
(45) Date of Patent: May 8, 2007

(54) PROCESS FOR PRODUCING VINEGAR MARINE ALGAE POWDER

(75) Inventor: Yoshihide Hagiwara, Takarazuka (JP)

(73) Assignee: Japan Pharmaceutical Development Co., Ltd., Osaka (JP)

( * ) Notice: Subject to any disclaimer, the term of this patent is extended or adjusted under 35 U.S.C. 154(b) by 418 days.

(21) Appl. No.: 10/363,991

(22) PCT Filed: Sep. 11, 2001

(86) PCT No.: PCT/JP01/07875

§ 371 (c)(1),
(2), (4) Date: Mar. 10, 2003

(87) PCT Pub. No.: WO02/21941

PCT Pub. Date: Mar. 21, 2002

(65) Prior Publication Data

US 2003/0180422 A1    Sep. 25, 2003

(51) Int. Cl.
*A61K 36/05*    (2006.01)
*A61K 36/02*    (2006.01)

(52) U.S. Cl. .................................... 424/195.17

(58) Field of Classification Search ............... 424/725, 424/195.17
See application file for complete search history.

(56) References Cited

FOREIGN PATENT DOCUMENTS

| JP | 356075082 A | * | 6/1981 |
| JP | 356152416 A | * | 11/1981 |
| JP | 362083874 A | * | 4/1987 |
| JP | 411318348 A | * | 11/1999 |

OTHER PUBLICATIONS

Seaweed Salad; Boston Globe, Boston, Mass.: Mar. 9, 1995, p. 3 (pp. 1-2 of ProQuest).*
Hodgson,M : What's as Green as Ireland and Smoky as a Peat Fire?; The New York Times, New York, NY.: Mar. 12, 1997, p. C1, )pp. 1-5 of ProQuest.*

* cited by examiner

*Primary Examiner*—Patricia Leith
(74) *Attorney, Agent, or Firm*—Hahn & Voight PLLC

(57) ABSTRACT

The present invention provides a vinegar marine algae powder or grain which is rich in marine algae minerals and dietary fibers in a highly absorbable form and which has a favorable taste.

10 Claims, No Drawings

PROCESS FOR PRODUCING VINEGAR MARINE ALGAE POWDER

TECHNICAL FIELD

The present invention relates to a novel vinegar marine algae processed food, more specifically to a vinegar marine algae powder or grain in which scarcely digestive polysaccharides contained in marine algae are changed to low molecular polysaccharides having an excellent digestive property by treating marine algae such as tangle (konbu) with vinegar and which is rich in organic acid mineral salts and a process for producing the same.

BACKGROUND ART

Marine algae have so far widely been used for foods in the forms of, for example, tangle stock, scraped tangle, vinegared dishes of vegetables and marine algae, vinegared dishes of Mozuku, seasoned tangle, vinegared tangle, marine algae salad and cooked foods. Further, agar, sodium algate and carrageenan which are extracted from marine algae are widely utilized in the fields of medicines, foods and cosmetics.

On the other hand, marine algae contain a plenty of minerals such as iodine, iron, calcium, magnesium, potassium, phosphorus, zinc and copper and water-soluble dietary fibers, and they are effective for prevention of high blood pressure and arteriosclerosis, prevention of colon cancer, prevention of senile change starting from intestines, dissolution of constipation, a reduction in a blood sugar value, supplement of calcium, prevention of a reduction in an immune strength caused by shortage of minerals and prevention of hepatic cirrhosis and myocardial infarct caused by shortage of potassium. Particularly in recent years, it is said that life habit diseases such as cancer, cardiac disease, cerebral apoplexy, diabetes, high blood pressure and renal disease are caused largely by food life, and intake of marine algae is being looked at again.

Marine algae powder and grains and tablets and capsules containing them are commercially available in the market as health foods for the purpose of taking marine algae, but they usually have very bad taste and are inferior in tastiness. In addition thereto, polysaccharides contained in marine algae are scarcely digestive, and important minerals contained in marine algae are combined with alga components in an insoluble form, so that there are the problems that even if marine algae are used for foods in the form of powder and grains, it is difficult to digest and absorb minerals and sugar as nutrient components and that incapable of being sufficiently displayed are the effects of minerals such as calcium, magnesium, iron, potassium, sodium and zinc which are origins of important taste and body for foods.

DISCLOSURE OF THE INVENTION

The present inventors have succeeded in producing marine algae powder or grains in order to make it possible to widely and generally utilize marine algae containing a plenty of water-soluble dietary fibers and minerals in the form of health foods which can be eaten at any time, and they have come to complete the present invention.

Thus, according to the present invention, provided is a vinegar marine algae powder or grain comprising a marine algae powder in which each powder particle is at least partially covered with a vinegar component or a marine algae powder which is subjected to impregnation treatment with vinegar.

The vinegar marine algae powder or grain and a process for producing the same each provided by the present invention shall be explained below in further details.

The vinegar marine algae grain of the present invention can be produced by carrying out granulation while spraying vinegar suitably containing a binder in blending a marine algae powder with additives such as an edible filler and the others and granulating them by means of a fluidized drying granulating machine.

A tangle powder is optimum as the marine algae powder used for a raw material but it shall by no means be restricted thereto, and powders of various marine algae including brown algae, red algae and green algae such as wakame seaweed, Hijiki and Eucheuma can be used as well. These marine algae can be pulverized by crushing sufficiently dried marine algae by means of a conventionally known powder apparatus such as, for example, a cutter mill, a roll crusher, a disintegrator, a disk mill, a centrifugal classification type mill and a jet crusher, which are combined if necessary, and the degree of pulverization in this case shall not strictly be restricted and can be changed according to the form of the finished product. In general, it can be allowed to fall in a range of 20 to 200 mesh, preferably 50 to 150 mesh.

The marine algae powder thus obtained may be subjected to granulation treatment as it is but is usually subjected to granulation treatment after blending an edible filler or the other additives.

The edible filler described above includes, for example, gelatin, gum arabic, traganth, starch, dextrin, cyclodextrin, glucose, fructose, lactose, saccharose, starch decomposition products, non-fat dry milk, whole milk, soybean albumin, methyl cellulose and calboxymethyl cellulose. The other additives include, for example, vitamins such as carotene, vitamin B and vitamin C; minerals such as calcium acetate, calcium carbonate, calcium phosphate, calcium lactate, magnesium carbonate, sodium phosphate, sodium citrate, potassium citrate and edible salts of elements such as Zn, Mo, Fe, Cu, Se and I; and condiments such as sugar, sodium chloride and enzymes. These fillers and other additives can be used, if necessary, alone or in combination of two or more kinds thereof.

A blending proportion of these fillers and/or other additives to the marine algae powder shall by no means be restricted and can freely be settled, and the fillers and the other additives are preferably used in a proportion of 0.1 to 1,000 parts by weight, particularly 20 to 500 parts by weight in terms of the total thereof per 100 parts by weight of the marine algae powder.

The marine algae powder described above is closely mixed with the fillers and/or the other additives and then charged into a fluidized drying granulating machine, and they are granulated while spraying vinegar containing suitably a binder.

Capable of being used as the vinegar to be sprayed are, for example, optional edible vinegars such as rice vinegar, cereal vinegar (black vinegar and the like), fruit vinegar, synthetic vinegar and an acetic acid aqueous solution. In general, brewed vinegar is suited since it contains a plenty of various organic acids.

Further, the binder which is suitably used includes, for example, alginic acid, fucoidan, agar-agar, glue plant, Eucheuma, gum arabic, traganth, gelatin, soybean albumin, starch, dextrin, cyclodextrin and calboxymethyl cellulose. When using these binders, they can be used usually in a proportion of 100 g or less, preferably 5 to 50 g per liter of the vinegar.

An amount of the vinegar sprayed on the marine algae powder or the blended matter of the marine algae powder, the fillers and the other additives suitably falls, though depending on the operating conditions of a granulating machine, in a range of usually 10 to 200 parts by weight, particularly 30 to 100 parts by weight per 100 parts by weight of the marine algae powder. An intake air temperature for spraying the vinegar is suitably a temperature falling in a range of about 70 to about 120° C., particularly about 75 to about 100° C.

A fluidized drying granulating machine can be operated in the same manner as usually carried out, except that the vinegar suitably containing the binder described above is sprayed as a spraying liquid.

Thus, capable of being obtained is a vinegar marine algae grain containing a marine algae powder in which each powder particle is at least partially covered with a vinegar component.

Also, the vinegar marine algae powder of the present invention can be produced by subjecting a marine algae powder suitably blended with an edible filler and the other additives to impregnation treatment with vinegar and then drying and pulverizing it.

To be specific, the vinegar described above is added to the marine algae powder or the blended matter of the marine algae powder, the fillers and the other additives which is prepared in the manner described above and admixed therewith, and then the admixture is left standing until the vinegar is sufficiently impregnated into the marine algae powder, for example, for 10 minutes to 24 hours. An addition amount of the vinegar shall not strictly be restricted and can be changed according to the kind of the vinegar used, and it suitably falls in a range of usually 50 to 2,000 parts by weight, preferably 100 to 1,000 parts by weight per 100 parts by weight of the marine algae powder. As described above, the vinegar suitably containing the binder can be used as well for the impregnation treatment.

The marine algae powder or the blended matter of the marine algae powder, the fillers and the other additives which is subjected to the impregnation treatment is then dried and pulverized. This drying and pulverization can be carried out by a conventionally known method, for example, a spray drying method and a freeze drying method.

The spray drying is preferably carried out on the condition that the vinegar component suitably remains, for example, on the conditions of a blast temperature of about 170 to about 220° C., particularly about 180 to about 200° C. and an exhaust temperature of about 110 to about 150° C., particularly about 110 to about 130° C.

When the impregnation-treated matter prepared from the marine algae powder or the blended matter of the marine algae powder, the fillers and the other additives has a too high viscosity to be suited to spraying in spray drying, water can be added to control it to a viscosity which is suited to spraying.

This makes it possible to obtain the vinegar marine algae powder containing the vinegar component in the respective powder particles.

The vinegar marine algae powder or grain of the present invention which is produced in the manner described above has various excellent advantages that (1) alga minerals form water-soluble salts with various organic acids contained in vinegar (brewed vinegar), so that a plenty of organic acid mineral salts which can readily be absorbed from mucous membranes and digestive organs are contained therein; (2) various sugars, amino acids, peptides and the like originating in vinegar (brewed vinegar) are contained therein, and the coexistence of these components with the alga minerals markedly improves the taste and the flavor and makes the tastiness excellent; and (3) scarcely digestive and scarcely soluble polysaccharides originally contained in marine algae are decomposed into low molecular polysaccharides which are easily digested and absorbed, and water-soluble and easily absorbable dietary fibers are contained therein in large amounts.

Thus, the vinegar marine algae powder or grain of the present invention can be used for food as it is or it can be compression-molded into tablets or filled into capsules and supplied in the form of health food. Further, it can widely be utilized to processed foods, for example, by mixing with cut amanori, sesame, bonito powder, salt and spice to prepare a fish flour.

The present invention shall more specifically be explained below with reference to examples, but the present invention shall not be restricted only to them.

EXAMPLES

Example 1

Rice vinegar 400 L was added to 100 kg of a mixture of 40 kg of a tangle powder, 30 kg of dextrin, 20 kg of maltose, 3 kg of salt, 0.5 kg of Eucheuma aqueous extract, 5 kg of starch and 1.5 kg of vitamin C, and they were mixed and left standing through a night. Then, 500 L of water was further added thereto, and spray drying was carried out at a blast temperature of 190° C. and an exhaust gas temperature of 130° C. to obtain 120 kg of a vinegar tangle powder.

Example 2

Mixed were 100 kg of a tangle powder and 300 L of rice vinegar, and the mixture was left standing through a night. Then, 1000 L of water was added thereto to elevate the fluidity, and spray drying was carried out at a blast temperature of 180° C. and an exhaust gas temperature of 120° C. to obtain 122 kg of a vinegar tangle powder.

Example 3

Mixed were 50 kg of a wakame seaweed powder, 50 kg of dextrin, 100 L of cider vinegar and 200 L of rice vinegar, and the mixture was left standing at 60° C. for 5 hours. Then, 800 L of water was added thereto, and spray drying was carried out at a blast temperature of 180° C. and an exhaust gas temperature of 130° C. to obtain 118 kg of a vinegar wakame seaweed powder.

Example 4

| | |
|---|---|
| Wakame seaweed powder | 30 kg |
| Dextrin | 20 kg |
| Cyclodextrin | 20 kg |
| Sugar | 20 kg |
| Salt | 4 kg |
| Vitamin C | 2 kg |
| Alginic acid | 1 kg |
| Eucheuma | 1 kg |

Added to the mixture described above were 100 L of cider vinegar and 200 L of rice vinegar, and they were mixed and left standing through a night. Then, 1000 L of water was added thereto to dilute the mixture, and spray drying was carried out at a blast temperature of 190° C. and an exhaust gas temperature of 120° C. to obtain 122 kg of a vinegar wakame seaweed powder.

Example 5

Added and mixed were 50 g of a wakame seaweed powder, 50 g of starch and 200 mL of rice vinegar containing 5 b % of acetic acid, and the mixture was left standing for 5 hours and then freeze-dried to obtain 112 g of a vinegar wakame seaweed powder.

Example 6

| | | |
|---|---|---|
| Kelp powder | 50 | kg |
| Dextrin | 20 | kg |
| Cyclodextrin | 10 | kg |
| β-carotene | 100 | g |
| Vitamin $B_1$ | 100 | g |
| Vitamin $B_2$ | 100 | g |
| Vitamin C | 2 | kg |
| Sugar | 20 | kg |
| Salt | 4 | kg |
| | 106.3 | kg |

Out of the mixture described above, 96 kg was put in a fluidized drying granulator, and then a rice vinegar solution prepared separately by adding the remainder (about 10 kg) of the mixture described above to 40 L of rice vinegar in which 0.5 kg of alginic acid and 0.5 kg of Eucheuma were dissolved and contained and mixing and dissolving them was sprayed by hot air of 80° C. and granulated to obtain 98 kg of vinegar kelp grains.

Example 7

| | | |
|---|---|---|
| Tangle powder | 40 | kg |
| Dextrin | 23 | kg |
| Lactose | 15 | kg |
| Sugar | 15 | kg |
| Salt | 4 | kg |
| Vitamin C | 3 | kg |
| | 100 | kg |

Out of the mixture described above, 90 kg was put in a fluidized drying granulator, and then a black vinegar solution prepared separately by adding the remainder (10 kg) of the mixture described above to 40 L of black vinegar in which 0.3 kg of alginic acid and 0.3 kg of Eucheuma were dissolved and contained and mixing and dissolving them was sprayed by hot air of 80° C. and granulated to obtain 95 kg of vinegar tangle grains.

The invention claimed is:

1. A production process for a vinegar marine algae powder, characterized by (a) subjecting a marine algae powder blended with an edible filler and additives to an impregnation treatment with vinegar and then (b) drying and pulverizing the blend obtained in part (a).

2. The process as described in claim 1, wherein the impregnation treatment is carried out with 50 to 2000 parts by weight of the vinegar per 100 parts by weight of the marine algae powder.

3. The process as described in claim 1, wherein the drying and pulverization is carried out by a spray drying method or a freeze drying method.

4. The process as described in claim 1, wherein the drying and pulverization is carried out on the conditions of a blast temperature of about 170 to about 220° C. and an exhaust temperature of about 110 to about 150° C.

5. The production process for a vinegar marine algae powder of claim 1, wherein said additives are selected from the group consisting of vitamins, minerals, edible salts and condiments.

6. The production process for a vinegar marine algae powder of claim 5, wherein said vitamins are selected from the group consisting of carotene, vitamin B and vitamin C.

7. The production process for a vinegar marine algae powder of claim 5, wherein said minerals are selected from the group consisting of calcium acetate, calcium carbonate, sodium phosphate, sodium citrate and potassium citrate.

8. The production process for a vinegar marine algae powder of claim 5, wherein said edible salts are selected from the group consisting of Zn, Mo, Fe, Cu, Se, and I.

9. The production process for a vinegar marine algae powder of claim 5, wherein said condiments are selected from the group consisting of sugar and sodium chloride.

10. The production process for a vinegar marine algae powder of claim 5, further comprising enzymes.

* * * * *

UNITED STATES PATENT AND TRADEMARK OFFICE
CERTIFICATE OF CORRECTION

| | | |
|---|---|---|
| PATENT NO. | : 7,214,378 B2 | Page 1 of 1 |
| APPLICATION NO. | : 10/363991 | |
| DATED | : May 8, 2007 | |
| INVENTOR(S) | : Hagiwara | |

It is certified that error appears in the above-identified patent and that said Letters Patent is hereby corrected as shown below:

Face of patent, col. 1, line 30, add --(30) Foreign Application Priority data--

Face of patent, col., 1, line 31, add --September 12, 2000 (JP) .............2000-276518--

Signed and Sealed this

Twenty-sixth Day of June, 2007

JON W. DUDAS
*Director of the United States Patent and Trademark Office*